Patented Sept. 25, 1951

2,568,872

UNITED STATES PATENT OFFICE 2,568,872

POLYMERIC MATERIALS DERIVED FROM DI-2-PROPENYL PHTHALATES

Pliny O. Tawney, Passaic, N. J., assignor to United States Rubber Company, New York, N. Y., a corporation of New Jersey No Drawing. Application December 4, 1946, Serial No. 713,920

1 Claim. (Cl. 260—78.3)

My invention relates to a new class of unsaturated polymeric materials which are soluble in a variety of organic liquids, but which are convertible to insoluble, infusible resins in the presence of heat and/or catalysts, by further polymerization, or by copolymerization with reactive compounds containing an ethylenic linkage. More particularly my invention relates to unsaturated, polymeric materials derived from a di-2-propenyl phthalate.

It is well known that the polymerization of a di-2-alkenyl phthalate, such as diallyl phthalate, leads to the formation of an insoluble gel after a relatively small amount of the monomer has been converted to the polymeric form. The resulting mixture, which consists of a minor proportion of insoluble, infusible, polymeric di-2-propenyl phthalate suspended in and swollen by a major proportion of unreacted monomeric di-2-propenyl phthalate together with a small amount of low molecular weight polymer, is exceedingly difficult to manipulate in various processing operations and is practically devoid of commercial utility. For example, its use in coating compositions is severely restricted by its inability to dissolve completely in organic solvents, and even when applied directly, i. e., in the absence of solvents, the resulting films are weak, uneven, non-uniform, and unattractive because of the presence of lumps of gelled polymer. Similarly when the mixture is cast in bulk by heating in a mold with additional catalyst until further polymerization occurs, the resulting castings are structurally weak and characterized by pronounced strains.

Numerous attempts have been made to overcome the above-mentioned disadvantages and render the polymers of di-2-propenyl phthalates commercially useful. One procedure suggested (cf. U. S. Patents 2,218,439 and 2,273,891) consists in halting the polymerization of the di-2-propenyl phthalate short of the point at which the formation of an insoluble phase becomes apparent (i. e., the gel point). The resulting product, however, contains only a relatively small amount of soluble, partially polymerized di-2-propenyl phthalate admixed with a much larger proportion of unreacted monomer which must be laboriously isolated and recycled for use in subsequent polymerizations. The polymer itself must be purified by dissolving it in a solvent and reprecipitating it with a non-solvent. Obviously such a procedure is both expensive and time-consuming.

Polymerization in the presence of solvents does effect some increase in the yield of soluble polymeric di-2-propenyl phthalates obtained prior to gelation, if the reaction is carried out in a dilute solution. However, the conversion of monomer to soluble polymer by this method is still comparatively inefficient, while the large volumes of solvent required in industrial scale operations increase the overall cost of the process and simultaneously decrease the production capacity of the reaction vessel.

The use of high reaction temperatures above 180° C. and/or large amounts of catalyst, as proposed in U. S. Patent 2,273,891, to increase the yield of soluble polymeric di-2-propenyl phthalate, is objectionable since under such vigorous conditions the polymerization is less amenable to control particularly in reaction vessels of industrial size and premature insolubilization of the reaction mixture becomes even more difficult to avoid. Moreover, the use of large amounts of peroxidic catalyst appreciably increases the overall cost of the polymerization and tends to contaminate the polymeric product with the fragments and decomposition products of the catalyst. The use of polymerization inhibitors such as hydroquinone and copper salts to avert gelation of the polymerizing reaction mixture is likewise undesirable. In practice it is necessary to carry out a very careful and complete separation of these inhibitors from the polymeric product to avoid discoloration thereof as well as retardation or complete inhibition of its subsequent conversion to the insoluble infusible state. On a commercial scale this separation is particularly laborious and time-consuming and adds to the overall cost of the product. The polymerization of di-2-propenyl phthalates in aqueous emulsion, as mentioned in U. S. Patent 2,218,439, has proven inferior even to the above-mentioned organic solvents with respect to the yield of soluble unsaturated polymer obtained.

The copolymerization of a di-2-propenyl phthalate with a homopolymerizable monomer leads rapidly to the formation of an insoluble cross-linked product before more than a very minor amount of the di-2-propenyl phthalate has become incorporated in the copolymer. For example, this is shown by Garvey and Alexander in U. S. Patent 2,202,846. Furthermore, D'Alelio has disclosed in U. S. Patent 2,332,900 that the copolymerization of diallyl esters, including di-2-propenyl phthalate, with unsaturated compounds which themselves are difficulty polymerizable, e. g., the 2-propenyl esters of inorganic oxy-acids, also leads to the formation of insoluble, crosslinked products. Hence, the copolymerization of di-2-propenyl phthalates with various monomers has been shown in the art to be of little or no utility in securing high yields of soluble unsaturated polymers, and these copolymerizations are, therefore, open to the same objections previously cited for the homopolymerization methods.

I have now unexpectedly discovered that by polymerizing a mixture of a di-2-propenyl phthalate with a 2-propenyl chloride high yields of soluble, fusible, unsaturated copolymers can be obtained. In further contrast to the prior art, the preparation of my new copolymers, by which the major proportion of a monomeric di-2-propenyl phthalate can be converted to the polymeric form without insolubilization, proceeds smoothly at moderate temperatures and does not require the presence of solvents, inhibitors, excess catalyst, or other special reaction conditions and precautions heretofore employed by the art in an attempt to avert premature gelation. According to prior art methods large amounts of inert solvents are necessary to achieve any substantial repression of gelation. On the other hand, the copolymerizable 2-propenyl chlorides employed in my invention have proven remarkably efficient in repressing gelation even when they are present in the reaction mixture in relatively small amounts. The resulting unsaturated copolymers are obtained in high yields, are uniform in character and uncontaminated with the high molecular weight, insoluble gel encountered in many of the prior art polymers of di-2-propenyl phthalates, and hence the necessity for extensive purification is obviated. My new copolymers totally dissolve in a number of common organic solvents, and they cure rapidly and completely to the insoluble, infusible state. This combination of attributes makes my products well suited to the formation of coating and impregnating compositions.

That my products are true copolymers is proven by elementary analysis and other specific tests. They contain attached to the polymer chain, unsaturated ester groups which can be polymerized to convert the copolymers to insoluble cross-linked products. The unsaturated ester groups will also undergo alcohol interchange with other saturated and unsaturated alcohols. My copolymers also contain chlorine in the form of side-chain chloromethyl groups which permit modification of the copolymers by treatment with appropriate reagents capable of replacing the chlorine with various groups such as hydroxyl, mercapto, alkoxy, alkenoxy, acyloxy, cyano, etc. Similarly the copolymers may be modified by treatment with the corresponding polyfunctional reagents such as glycols, sodium salts or polycarboxylic acids, etc.

My new copolymers contain organically combined chlorine, which lowers their burning rate and renders them eminently useful as the film-forming component of flame-proofing compositions. Moreover my copolymers dissolve in various solvents to form solutions of low viscosity—a useful attribute in coating and impregnating operations.

Of the di-2-alkenyl phthalates useful in my invention, diallyl phthalate and dimethallyl phthalate have proven particularly satisfactory, while the preferred 2-alkenyl chlorides have the type formula $CH_2=C(R)-CH_2Cl$ where R is selected from the class consisting of hydrogen, chlorine, methyl, and chloromethyl. Exemplary of these 2-alkenyl chlorides are allyl chloride, methallyl chloride, 2-chloroallyl chloride, and 2-(chloromethyl)-allyl chloride. Where products of lowest burning rate are desired, the copolymers of such a di-2-alkenyl phthalate with 2-chloro-allyl chloride and with 2-(chloromethyl)-allyl chloride are preferred. In general, the highest yields of copolymeric products are obtained when the 2-alkenyl groups in the phthalate and in the chloride, respectively, are dissimilar. A mixture of isomeric dichlorobutenes (B. P. 130–135° C.; $N_D^{20}=1.4379$), obtained as a by-product in the chlorination of isobutylene, has proven to be as efficacious as many of the simple 2-alkenyl chlorides in carrying out my invention. The principal component of this mixture is 2-(chloromethyl)-allyl chloride.

The analagous compounds of other halogens, e. g., allyl iodide, methallyl bromide, have proven markedly inferior and in some cases actually inoperable in the process of my invention.

The relative proportions of the di-2-alkenyl phthalate and the 2-alkenyl chloride present in the copolymerizable reaction mixture may be varied over a considerable range depending upon the physical properties and the amount of chlorine desired to be present in the polymeric product. Copolymerization of the di-2-alkenyl phthalate with as little as 5% of the 2-alkenyl chloride (based on the weight of the phthalate) is sufficient to repress gelation of the reaction mixture during the early stages of the copolymerization and to insure an increased yield of soluble unsaturated product. The higher the amount of the copolymerizable 2-alkenyl chloride present, the higher the amount of the monomeric di-2-alkenyl phthalate which can be converted to copolymeric form without insolubilization, and optimum yields of soluble product can be obtained with as much as 200% of the 2-alkenyl chloride. Since my copolymers are readily soluble in the 2-alkenyl chlorides, the copolymerizations may be conducted in the presence of an excess of the 2-alkenyl chloride, e. g., 400%, if desired, for the resulting mobile, free-flowing solutions are easily handled in transfer, mixing, storage, and other mechanical operations to which the solid copolymers themselves may be less amenable.

In the preparation of my new copolymers, the reaction temperatures may range from about 25° C. up to and somewhat above the boiling point of the 2-alkenyl chloride, and for overall economy it is preferred to operate in the latter range, i. e., at the reflux temperature of the reaction mixture. Higher temperatures can be employed, of course, but the necessary pressure equipment entails additional expense without offering any marked compensating advantages. Suitable polymerization catalysts include hydrogen peroxide, acetyl peroxide, benzoyl peroxide, acetyl benzoyl peroxide, succinyl peroxide and tertiary-butyl hydrogen peroxide, the concentrations thereof being preferably maintained in the range of 1 to 5 mole-percent of the mixture of copolymerizable monomers. The course of the copolymerizations can be followed by observing the increase in the viscosity of the reaction mixtures, and, after halting the reactions by cooling, the copolymers can be readily isolated from the reaction mixtures by distilling off any unreacted starting materials or by extracting them with a solvent in which the copolymers are insoluble, such as an aliphatic hydrocarbon, e. g., n-hexane. Although unnecessary for many commercial applications, the copolymers can be further refined, if desired, by dissolving them in a solvent such as acetone and precipitating them with a non-solvent such as n-hexane.

The resulting polymeric materials can be cast or molded in known manner to form rods, blocks, sheets, etc. They can also be dissolved in appropriate solvents and employed as lacquers or as impregnating and water-proofing compositions. In the preparation of such solutions, it it unnecessary to isolate the copolymers as is done in the prior art, for higher boiling solvents can be added directly to the crude copolymerization reaction mixtures, and any unreacted 2-alkenyl chlorides can then be removed by distillation. This effects a further saving in both the time and expense of the process and adds to the economic advantage of my copolymers.

Application of heat to compositions containing my unsaturated copolymers, particularly in the presence of peroxidic polymerization catalysts, induces further polymerization, and the resulting cross-linked products are quite indifferent to heat and strongly resistant to attack by solvents. Suitable dyes, pigments, fillers, plasticizers, and resins can be incorporated with my copolymers in the soluble fusible stage prior to final cure.

My soluble unsaturated copolymers can also be converted to the insoluble, infusible state by interpolymerization with reactive monomers containing an ethylenic linkage, e. g., methyl acrylate, vinyl acetate, diethyl fumarate, allyl acrylate, diallyl fumarate, etc. At the soluble stage, my copolymers dissolve readily in a number of these reactive monomers to yield solutions which are often quite fluid even at high solids content. Such solutions can be totally copolymerized, leaving no solvent to be evaporated, and are useful not only as coating compositions but particularly in casting, laminating, and impregnating operations, where articles capable of being pre-formed and then "set" or cured in a final shape are desired.

The following examples disclose my invention in more detail, all parts being by weight.

EXAMPLE I

To demonstrate my discovery that copolymerizing the di-2-alkenyl phthalate with the 2-alkenyl chloride represses gelation of the reaction mixture and thereby increases the yield of soluble polymeric product, mixtures of the di-2-alkenyl phthalates and the 2-alkenyl chlorides in various proportions are heated at 120° C. in sealed containers with a commercial 60% solution of tertiary-butyl hydrogen peroxide to the point of incipient gelation—save in the case starred (*) in Table I below which still shows no signs of gelation after heating for the time indicated. The reactions are halted by cooling, and the reaction mixtures are poured into a commercial grade of n-hexane. The precipitated copolymers are further purified by dissolving them in chloroform and precipitating them with n-hexane. After drying in vacuo to constant weight, the amounts of the polymeric products are determined.

The pertinent data are summarized below in Table I, including the weights of the copolymerizable monomers, peroxide catalyst, and product, as well as the reaction times. For purposes of comparison only, polymerization runs with dimethallyl phthalate alone (I–a), and with diallyl phthalate both alone (I–c) and also in the presence of unreacted solvents (I–h, –i), are included to illustrate more fully the advantages of my invention.

*Table I*

|   | Dimethallyl Phthalate | Diallyl Phthalate | Allyl Chloride | Methallyl Chloride | Peroxide | Reaction Time (hours) | Polymeric Product |
|---|---|---|---|---|---|---|---|
| a | 100 |  |  |  | 5.50 | 15.0 | 42.6 |
| b | 100 |  | 55.7 |  | 4.95 | 21.0 | 108.0 |
| c |  | 100 |  |  | 0.311 | 11.0 | 28.1 |
| d |  | 100 |  | 4.07 | 0.815 | 14.0 | 60.5 |
| e |  | 100 |  | 9.12 | 0.912 | 17.0 | 74.4 |
| f |  | 100 |  | 15.70 | 1.045 | 24.0 | 81.2 |
| g |  | 100 |  | 24.40 | 1.220 | *120.0 | 85.5 |
| h |  | 100 |  | (¹) | 2.48 | 4.75 | 76.0 |
| i |  | 100 |  | (²) | 0.621 | 52.0 | 50.3 |

*No evidence of incipient gelation.
¹ 29.2 parts of carbon tetrachloride in place of the 2-propenyl chloride.
² 100 parts of benzene in place of the 2-propenyl chloride.

Comparison of I–a with I–b, and of I–c with I–d, shows that copolymerization of the di-2-alkenyl phthalate with even small amounts of the 2-alkenyl chloride is markedly effective in increasing the yield of soluble polymeric product prior to gelation; and I–e, –f and –g demonstrate the further increase in yield of soluble copolymer obtainable with the use of increased amounts of the 2-alkenyl chloride. Example I–g shows that when the copolymerization is carried out with a sufficient quantity of the 2-alkenyl chloride, high yields of soluble unsaturated polymer can be obtained with no danger of gelation. Comparison of I–e with I–h shows the copolymerizable 2-alkenyl chloride to be approximately three times as effective as a non-olefinic solvent, viz., carbon tetrachloride, in repressing gelation and increasing the yield of soluble polymeric product. Similarly, I–d and I–i show the 2-alkenyl chloride to be more than twenty-five times as effective (on a weight basis) as benzene in this respect.

EXAMPLE II (a) A mixture of 246.3 parts of diallyl phthalate, 90.6 parts of methallyl chloride, and 6.0 parts of a 60% solution of tertiary-butyl hydrogen peroxide is heated at reflux for 24 hours. A sample of the reaction mixture is withdrawn and purified for analysis by pouring it into n-hexane and then redissolving the precipitate copolymer in chloroform, followed by a second precipitation with n-hexane. The polymeric solid which is dried in vacuo to constant weight corresponds to an overall yield of 156 parts of copolymer.

Analysis, found: C, 65.44%; H, 6.24%; Cl, 7.12%; Iodine number (Wijs), 72.1.

The iodine number indicates the presence in the copolymer of unsaturation which is available for further polymerization.

(b) Three parts of the solid copolymer are dissolved in a mixture of 2.5 parts of xylene and 7.5 parts of chloroform and flowed onto a glass panel. After baking for 20 minutes at 200° C., a transparent adherent film is obtained which is resistant to attack by organic solvents such as acetone and chloroform and is substantially infusible.

A polymer prepared according to the method of the prior art, by heating a mixture of 24.6 parts of diallyl phthalate, 7.2 parts of carbon tetrachloride and 0.612 part of a 60% solution of tertiary-butyl hydrogen peroxide at 120° C. for 4.75 hours when subsequently baked on glass in the manner of my copolymer above, yields a film which is badly attacked by acetone, indicating a low degree of cure.

(c) To 100 parts of the crude copolymerization reaction mixture prepared in (a) above, 10 parts of diethyl fumarate are added and the solution is heated to 80° C. and 3 mm., until distillation of unreacted methallyl chloride ceases. Five parts of the residual solution are admixed with 0.15 part of benzoyl peroxide and cured in a mold by heating for 16 hours at 75° C., and then for two additional hours at 120° C. The resulting product is a hard tough casting which is resistant to solvents and is substantially infusible up to the point of pyrolytic decomposition.

While I have shown and described various embodiments of the invention, it is to be understood that the invention is susceptible to other modifications which appear within the spirit of the invention and the scope of the appended claim.

Having thus described my invention, what I claim and desire to protect by Letters Patent is:

An unsaturated copolymer of monomers consisting solely of diallyl phthalate and monomeric methallyl chloride, said copolymer resulting from the interpolymerization of said phthalate with said chloride in the presence of an amount of said chloride equal to about 9 to 400% of the weight of said phthalate, and said copolymer being characterized by solubility in chloroform, acetone and xylene.

PLINY O. TAWNEY.

REFERENCES CITED

The following references are of record in the file of this patent:

UNITED STATES PATENTS

| Number | Name | Date |
| --- | --- | --- |
| 2,273,891 | Pollack et al. | Feb. 24, 1942 |
| 2,378,195 | D'Alelio | June 12, 1945 |
| 2,378,197 | D'Alelio | June 12, 1945 |
| 2,433,616 | Marple et al. | Dec. 30, 1947 |
| 2,498,084 | Kuderna | Feb. 21, 1950 |